Oct. 12, 1937.　　　G. A. COTTON　　　2,095,489
PNEUMATIC TIRE
Filed Sept. 4, 1935
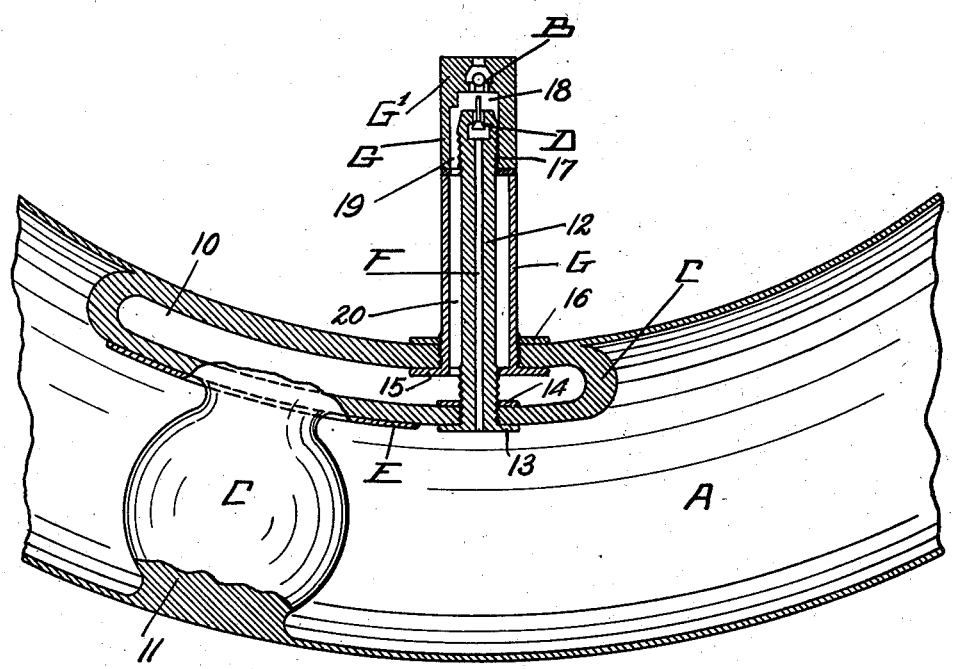
INVENTOR:
GEORGE A. COTTON.
ATTORNEYS.

Patented Oct. 12, 1937

2,095,489

UNITED STATES PATENT OFFICE 2,095,489

PNEUMATIC TIRE

George Albert Cotton, Hebden Bridge, England

Application September 4, 1935, Serial No. 39,166
In Great Britain September 13, 1934

5 Claims. (Cl. 152—11)

The invention relates to pneumatic tires for the wheels of vehicles, of the kind in which a hollow elastic element provided with air inlet and outlet valves is introduced within an air tube, whereby, should the tire become partly deflated from any cause, said elastic element is adapted to automatically pump air into said air tube to restore and maintain the tire in a proper state of inflation.

Heretofore, the inlet and outlet valves associated with the elastic member aforesaid, have consisted of self-contained separate valves, with a result, that, should it be desired to deflate the tube or tire a further separate valve has had to be provided at some part of said tube for this purpose.

The object of the present invention is to provide simple and efficient means for effecting automatic inflation, and also for enabling deflation of the tube to be effected when desired. To this end, the invention consists of an elastic member having a hollow portion and a solid portion preferably formed integral with the air tube, a rigid plate being interposed between said portions, said hollow portion being in communication with a combined inlet and outlet valve, in such a manner, that on a partial deflation of the tube occurring, air is automatically pumped into said tire through said valve, and when it is desired to deflate the tire, said valve may also be utilized for this purpose.

The invention will now be described with reference to the accompanying drawing which shows a sectional side view of a fragment of a pneumatic tube or tire and of the invention applied thereto.

Referring to the drawing, A indicates the inner tube of a pneumatic tire or the like. Positioned within the tube A is an elastic element or member which may comprise a hollow elongated portion 10 and a solid portion 11, said portions being offset relative to each other and preferably formed integrally with the tube A. A rigid plate E is interposed between the hollow portion 10 and the solid portion 11 to constitute a base or support for that part of the hollow portion adjacent the solid portion when the elastic member is expanded or contracted. A valve member 12 extends outwardly and upwardly from the bottom of the hollow portion 10 and through the tube A. The valve member 12 has its inner end flanged as at 13. Between the flange 13 and a retaining collar 14 threaded to the valve member 12, is clamped the inner wall of the hollow portion 10. The valve member 12 has an axially disposed through opening F which communicates at its lower end with the interior of the tube A and is provided at its opposite end with a combined air inlet and outlet pressure actuated valve D. A casing G surrounds the valve member 12 and is provided at its lower end with a flange 15 between which and a threaded collar 16 is clamped the outer wall of the hollow portion 10 and the tube A. The outer end of the casing G is closed by a cap G' threaded to the valve member 12 as at 17 to provide an air-tight closure at the outer end of the casing G. The cap G' has an air inlet valve B and forms a chamber 18 with the adjacent end of the member 12 when the parts are set up. The chamber 18 communicates through a port 19 with a passage 20 formed between the valve member 12 and the casing G. Thus means are provided for withdrawing air from the hollow portion 10 and discharging it into the inner tube A.

It will be seen that upon the tire becoming partly deflated, the elastic member C will be compressed and the hollow portion 10 contracted when the opposing part of the tire is in contact with the road surface, whereupon the air in the hollow portion 10 is extruded through the passage 20 to the passages 19 and into the chamber 18 under sufficient pressure to cause the valve B in the cap G' to close and the valve D to open, thus enabling the air to enter the passage F and pass through into the air tube A. When substantially all of the air in the hollow portion 10 of the member C has been extruded and the pressure thereon removed by the opposing part of the tire moving out of contact with the road surface, the elastic member C automatically regains its normal shape and as the outer and inner walls of the hollow portion 10 move away from each other, a vacuum is created within the chamber 18 which causes the valve B to open while the pressure of the air in the tube A and the opening F in the valve member 12 causes the valve D to be moved and held in its closed position. The opening of the air valve B fills the hollow portion 10 of the member C with a fresh supply of air. These intermittent operations are continued until the air tube A reaches the predetermined degree of inflation when further compression of the hollow portion 10 of the member C ceases.

When it is desired to deflate the air in tube A the cap G' may be removed and valve D operated to allow air to escape from the tube A. It will be seen that the valve D is so associated with the hollow portion 10 of the elastic element C and the inner tube A as to automatically pump air into the tube from the hollow portion 10 when the tire is partly deflated. Further when it is desired to deflate the tire, the valve D can be opened for this purpose. In other words, the valve D constitutes a combined air inlet and outlet valve for controlling the introduction of air from the hollow portion 10 into the inner tube A and the withdrawal of the air from the inner tube.

It is to be understood that the form of invention shown is merely illustrative of a preferred embodiment and that such changes may be made therein as fall within the purview of one skilled in the art without departing from the spirit of the invention and the scope of the appended claims.

By reducing the size of the member C relative to the diameter of the air tube, a different degree of inflation may be obtained.

What I claim as my invention, and desire to secure by Letters Patent, is:—

1. In combination with the inner tube of a pneumatic tire, an elastic member within the tube having a solid portion and a hollow portion, a casing connected to the tube and communicating with the interior of the hollow portion, and valve means extending axially into the casing and communicating with the interior of the tube for controlling the supply of air from the hollow portion to the tube, whereby upon the tube being deflated the elastic member is contracted by pressure transmitted through the solid portion on deformation of the portion of the tire in contact with the road so as to force air from the hollow portion through the casing and to open the valve and be conducted to the inner tube to inflate the same.

2. In combination with the inner tube of a pneumatic tire, an elastic member within the tube having a solid portion and a laterally offset hollow portion, a casing connected to the tube and communicating with the interior of the hollow portion, and valve means extending axially within the casing and communicating with the interior of the tube for controlling the supply of air from the hollow portion to the tube, whereby upon the tube being deflated the elastic member is contracted by pressure transmitted through the solid portion on deformation of the portion of the tire in contact with the road so as to force air from the hollow portion through the casing and to open the valve and be conducted to the inner tube to inflate the same.

3. In combination with the inner tube of a pneumatic tire, an elastic member within the tube having a solid portion and a hollow portion integral with the tube, a rigid plate interposed between said hollow portion and said solid portion, a casing connected to the tube and communicating with the interior of the hollow portion, and a combined air inlet and outlet valve member extending axially within the casing and communicating with the interior of the tube for controlling the supply of air from the hollow portion to the tube, whereby upon the tube being deflated the elastic member is contracted by pressure transmitted through the solid portion on deformation of the portion of the tire in contact with the road so as to force air from the hollow portion through the casing and to open the valve and be conducted to the inner tube to inflate the same.

4. In combination with the inner tube of a pneumatic tire, an elastic member within the tube and having a hollow portion and a solid portion, a casing connected to the tube and communicating with the interior of the hollow portion, a tubular member connected to the elastic member, said tubular member extending from the tube into said casing to form a passage therebetween, a cap for the casing threaded to the tubular member, and a check valve in said tubular member for controlling communication between the hollow portion and the tube, whereby upon the tire being deflated to cause the elastic member to be contracted by pressure transmitted through the solid portion on deformation of the portion of the tube in contact with the road so as to force air from the hollow portion through the casing and to open the valve and be conducted through the tubular member into the inner tube to inflate the latter.

5. In combination with the inner tube of a pneumatic tire, an elastic member within the tube and having a hollow portion and a solid portion, a casing connected to the tube and communicating with the interior of the hollow portion, a tubular member connected to the elastic member and extending within said casing, a cap for the casing threaded to the tubular member, said cap having a vacuum operated valve for controlling the admission of air into the casing, and means controlling the supply of air from the hollow portion to the inner tube whereby upon the tire being deflated, the elastic member is contracted by pressure transmitted through the solid portion on deformation of the portion of the tube in contact with the road to force air from the hollow portion to the interior of the tube through the casing and the tubular member, said means upon the hollow member regaining its normal shape for closing communication between the tube and the hollow portion and thereby creating a vacuum in the casing and the hollow portion for opening the vacuum valve to permit the introduction of air into the hollow member through the casing.

GEORGE A. COTTON.